Patented Aug. 4, 1925.

1,548,216

UNITED STATES PATENT OFFICE.

JOHN P. SHEPHERD, OF CHICAGO, ILLINOIS, ASSIGNOR, BY MESNE ASSIGNMENTS, TO SHEPHERD CHEMICAL COMPANY, A CORPORATION OF ILLINOIS.

CHOLESTERIN AND METHOD OF MANUFACTURE.

No Drawing.    Application filed January 24, 1920.   Serial No. 353,815.

*To all whom it may concern:*

Be it known that I, JOHN P. SHEPHERD, a citizen of the United States, and a resident of the city of Chicago, in the county of Cook and State of Illinois, have invented certain new and useful Improvements in Cholesterin and Methods of Manufacture; and I do hereby declare that the following is a full, clear, and exact description of the same.

This invention relates to the manufacture of cholesterin and products consisting principally of cholesterin, more particularly for use as ointments, salves and the like. Cholesterin is an alcohol, having the formula $C_{27}H_{45}OH$, which has been obtained heretofore from wool-fat, yolk of egg and other organic matter of animal origin.

One of the objects of the present invention is to provide a new source from which cholesterin may be obtained.

Another object is to provide an improved method for separating cholesterin from the other substances with which it is mixed or associated.

I have found that spermaceti contains 1.0 to 1.2% of cholesterin which is a higher percentage than is found in wool-fat or yolk of egg. Not only is the amount of cholesterin obtainable large, but also, as ordinarily prepared without being refined until it is chemically pure, the spermaceti product is superior to the wool-fat or egg product for use as an ointment or salve on account of the waxes it contains.

Preferably the cholesterin is extracted by saponifying the fats and then washing the soluble products from the insoluble cholesterin. This saponification may conveniently be carried out by the use of sodium ethylate and water.

As spermaceti is largely cetyl palmitate the reaction between the spermaceti, sodium ethylate and water may be represented by the following equation:

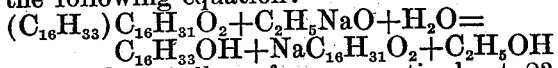

For each 100 lbs. of spermaceti about 23 lbs. of sodium ethylate and 6.1 lbs. of water are required.

It has been found that the proportions of alcohol, caustic alkali and water should be kept reasonably close to these figures, which I have defined in the claims as substantially molecular proportions. Thus if either the alcohol or the water are increased the sodium palmitate and cetyl alcohol cannot be washed away from the cholesterin since excess of alcohol produces a soft pasty mass while too much water causes crystallization.

Preferably the materials are warmed slightly, say to 50° C. to aid the saponification.

When the saponification is complete the product is placed in a bag and the mass kneaded therein with small additions of water from time to time to wash the cetyl alcohol, sodium palmitate, ethyl alcohol, etc., through the pores of the bag leaving the insoluble cholesterin behind. To reduce as far as possible loss of cholesterin the bag should be made of the heaviest and closest woven cotton twill obtainable.

Cetyl alcohol is soluble in ethyl alcohol while the cholesterin is substantially insoluble. On addition of water the cetyl alcohol is precipitated as an emulsion, the globules composing which are small enough to pass through the pores of the bag.

When finally the cholesterin has been substantially freed from extraneous materials it may be dried or mixed with other ingredients to form compound ointments, salves, tooth pastes and the like.

While I have described my process in connection with the preparation of cholesterin from spermaceti, it may also be used with other materials containing cholesterin, such as wool-fat and yolk of egg.

Further, in place of caustic soda and ethyl alcohol other saponifying materials and alcohols may be employed if desired. Various other modifications and changes may also be made in my invention without departing from the principles of my invention, and I therefore do not purpose limiting the patent granted hereon otherwise than necessitated by the prior art.

I claim as my invention:

1. The process of preparing cholesterin which includes treating spermaceti with an alkaline alcoholate and water in substantially molecular proportions to saponify the cetyl palmitate of the spermaceti and subsequently washing the insoluble cholesterin from the solution and emulsion of alkaline palmitate, alcohol from the said alcoholate and cetyl alcohol.

2. The process of preparing cholesterin which includes treating spermaceti with an alkaline alcoholate and water in substantially molecular proportions to saponify the cetyl palmitate of the spermaceti and obtain a product in which the cholesterin is present in comparatively large masses and then screening out with water the cholesterin from the remainder of the mass.

3. The process of preparing cholesterin which includes treating spermaceti with an alkali, a small amount of water and an alcohol capable of dissolving cetyl alcohol in substantially molecular proportions to saponify the cetyl palmitate to produce an alcoholic solution of cetyl alcohol, and subjecting the saponified product to a wet screening operation to separate the water soluble constituents and the emulsion of cetyl alcohol formed by the addition of water during the screening operation from the comparatively large masses of cholesterin.

4. The process of preparing cholesterin from substances containing cholesterin and the ester of a fatty acid and an alcohol insoluble in water which includes the saponification of the substances containing cholesterin and the solution of certain non-cholesterin constituents by means of alcohol, leaving the cholesterin undissolved in comparatively large masses and subjecting the product of such treatment to a wet screening operation to separate the water soluble constituents and the emulsion of substances thrown out of solution by the addition of water during the screening operation from the comparatively large masses of cholesterin.

5. The steps in the process of preparing cholesterin from substances containing it, which comprise forming an emulsion of the certain constituents to be separated from the cholesterin by adding water to an alcoholic solution of such constituents and subjecting the product of such treatment to a wet screening operation to separate such emulsion from the comparatively large masses of cholesterin.

In testimony whereof I have hereunto subscribed my name in the presence of two subscribing witnesses.

JOHN P. SHEPHERD.

Witnesses:
RIDSDALE ELLIS,
EARL M. HARDINE.